United States Patent
Dubucq et al.

(10) Patent No.: US 11,036,705 B2
(45) Date of Patent: Jun. 15, 2021

(54) TRAVERSAL OF DISPERSED LOCKLESS CONCURRENT INDEX NODES

(71) Applicant: International Business Machines Corporation, Armonk, NY (US)

(72) Inventors: Thomas Dubucq, Chicago, IL (US); Kevin Michael Freese, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/286,739

(22) Filed: Feb. 27, 2019

(65) Prior Publication Data
US 2020/0272611 A1    Aug. 27, 2020

(51) Int. Cl.
*G06F 16/22*    (2019.01)
*G06F 16/27*    (2019.01)

(52) U.S. Cl.
CPC .......... *G06F 16/2246* (2019.01); *G06F 16/27* (2019.01)

(58) Field of Classification Search
CPC ............. G06F 16/2246; G06F 16/2372; G06F 16/273; G06F 16/27
USPC ........................................................ 707/769
See application file for complete search history.

(56) References Cited

U.S. PATENT DOCUMENTS

| 4,868,743 | A | 9/1989 | Nishio |
| 5,416,892 | A | 5/1995 | Loken-Kim |
| 5,930,805 | A | 7/1999 | Marquis |
| 7,272,830 | B2 | 9/2007 | de Jong |
| 7,999,808 | B1 | 8/2011 | Aila et al. |
| 8,234,233 | B2 | 7/2012 | Zhou |
| 2004/0230583 | A1* | 11/2004 | Testa ................... H04L 45/7457 |
| 2017/0193023 | A1* | 7/2017 | Dhuse ................... G06F 3/0653 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Hung T Vy
(74) *Attorney, Agent, or Firm* — David K. Mattheis; William H. Hartwell; Nicholas L. Cadmus

(57) ABSTRACT

Traversing nodes of a Dispersed Lockless Concurrent Index (DLCI), by retrieving a node look-up request from a request queue, executing the look-up request across nodes of a DLCI, storing the look-up request results in a results queue, and adding new look-up requests associated with any node pointers from the node(s) of the look-up request, in the request queue.

20 Claims, 7 Drawing Sheets

TRAVERSAL OF DISPERSED LOCKLESS CONCURRENT INDEX NODES

BACKGROUND

The disclosure relates generally to traversing the nodes of a hierarchical data tree structure. The disclosure relates particularly to traversing the nodes of a dispersed lockless concurrent index (DLCI).

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, HADOOP is an open source software framework that supports distributed applications enabling application execution by thousands of computers. (Note: the term(s) "HADOOP" may be subject to trademark rights in various jurisdictions throughout the world and are used here only in reference to the products or services properly denominated by the marks to the extent that such trademark rights may exist.)

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

Computer data may be stored using hierarchical tree structures having indices carrying information regarding the data held in the structures. The tree structures and indices may be dispersed across the cloud storage resources in use by the computer.

SUMMARY

Aspects of the invention disclose methods, systems and computer readable media associated with traversing nodes of a Dispersed Lockless Concurrent Index DLCI. In one aspect the traversing includes: retrieving a node look-up request from a request queue, executing the look-up request across nodes of a DLCI, storing the look-up request results in a results queue, and adding new look-up requests associated with node pointers from the node(s) of the look-up request, in the request queue.

DETAILED DESCRIPTION

Computer data may be stored in a distributed storage network using multiple server computers distributed across a network. The contents of the stored data may be cataloged using a dispersed hierarchical indexing scheme wherein a tree structure of nodes each contain a portion of the data represented in a hierarchical relationship structure moving from a root node referencing all data to leaf nodes representing a defined smaller portion of the data. Determining which nodes contain references to data of interest may be accomplished by traversing the entire structure and searching each node, returning as a result those nodes of interest to a requesting application. Such a full traversal is time and resource intensive. The disclosed methods and systems offer an efficient alternative to a full traversal of the index tree by progressively searching the tree according to the relationships between nodes as defined by pointers held by the nodes and defining the inter-node relationships. Such searches require less time and resources to complete.

Figure 1:
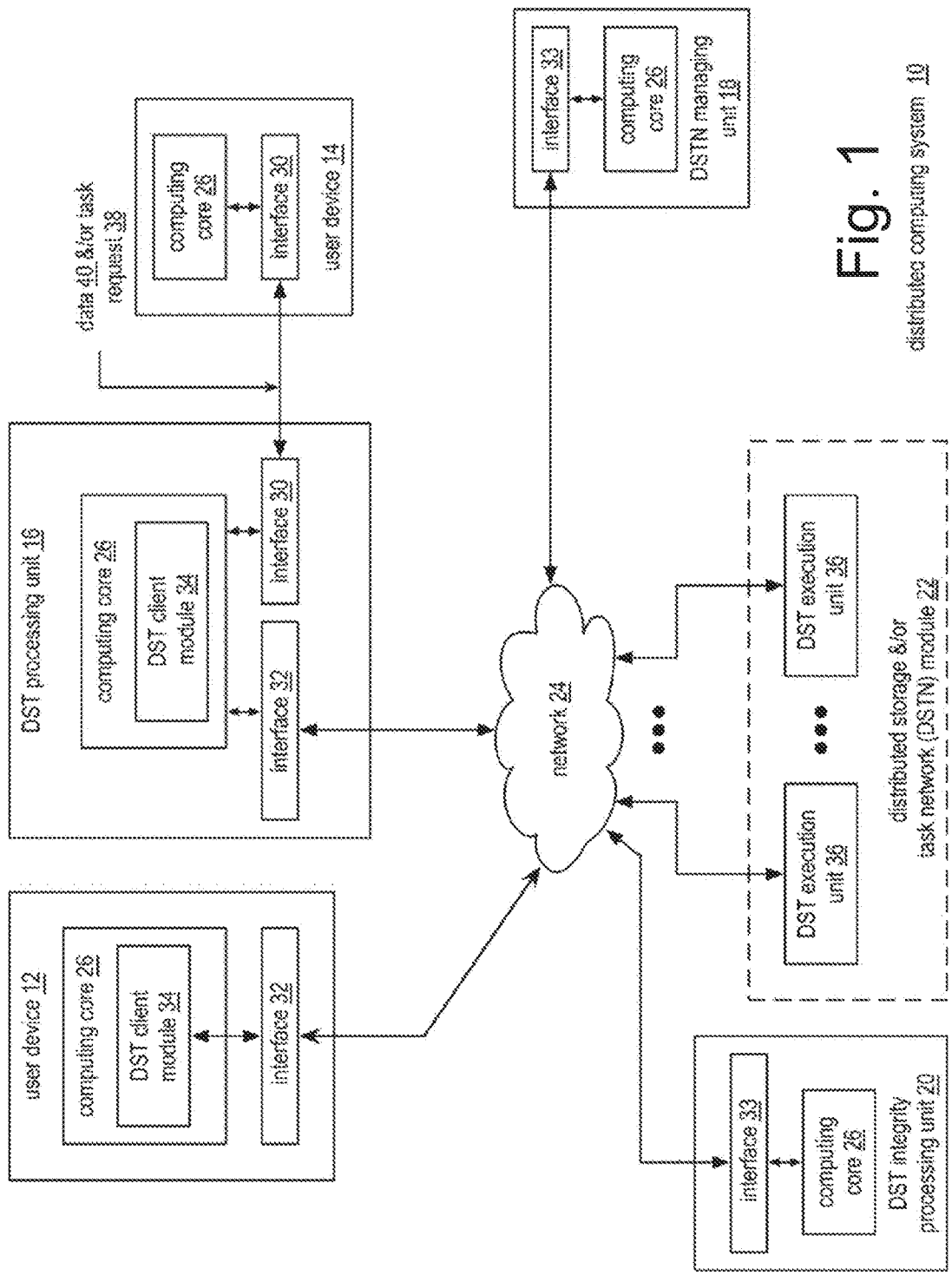
FIG. 1 provides a schematic illustration of distributed storage network, according to an embodiment of the invention.

FIG. 1 is a schematic block diagram of an embodiment of a dispersed, or distributed, storage network (DSN) 100 that includes a plurality of dispersed storage (DS) computing devices or processing units 12-16, a DS managing unit 18, a DS integrity processing unit 20, and a DSN memory 22. The components of the DSN 100 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of dispersed storage units 36 (DS units) that may be located at geographically different sites (e.g., one in Chicago, one in Milwaukee, etc.), at a common site, or a combination thereof. For example, if the DSN memory 22 includes eight dispersed storage units 36, each storage unit is located at a different site. As another example, if the DSN memory 22 includes eight storage units 36, all eight storage units are located at the same site. As an example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36.

DS computing devices 12-16, the managing unit 18, and the integrity processing unit 20 include a computing core 26, and network or communications interfaces 30-33 which can be part of or external to computing core 26. DS computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type or home or office computing equipment. Note that each or the managing unit 18 and the integrity processing unit 20 may be separate computing devices, may be a common computing device, and/or may be integrated into one or more or the computing devices 12-16 and/or into one or more or the dispersed storage units 36.

Each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/ or any other type of connection to/from the network 24) between computing devices 12 and 16 and the DSN memory 22. As an example, interface 33 supports a communication link for each of the managing unit 18 and the integrity processing unit 20 to the network 24.

In general, and with respect to DS error encoded data storage and retrieval, the DSN 100 supports three primary operations: storage management, data storage and retrieval. More specifically computing devices 12 and 16 include a dispersed storage (DS) client module 34, which enables the computing device to dispersed storage error encode and decode data (e.g., data object 40). In this example embodiment, computing device 16 functions as a dispersed storage processing agent for computing device 14. In this role, computing device 16 dispersed storage error encodes and decodes data on behalf of computing device 14. With the use or dispersed storage error encoding and decoding, the DSN 100 is tolerant of a significant number of storage unit failures (the number of failures is based on parameters of the dispersed storage error encoding function) without loss of data and without the need for redundant, or backup copies, of the data. Further, the DSN 100 stores data for an indefinite period of time without data loss and in a secure manner (e.g., the system is very resistant to unauthorized attempts at accessing or hacking the data).

The second primary function (i.e., distributed data storage and retrieval) begins and ends with a DS computing device 12-14. For instance, if a second type of computing device 14 has data 40 to store in the DSN memory 22, it sends the data 40 to the DS computing device 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCS1), etc.).

In operation, the managing unit 18 performs DS management services. For example, the managing unit 18 establishes distributed data storage parameters (e.g., vault creation, distributed storage parameters, security parameters, billing information, user profile information, etc.) for computing devices 12-16 individually or as part of a group or user devices. As a specific example, the managing unit 18 coordinates creation or a vault (e.g., a virtual memory block associated with a portion or an overall namespace or the DSN) within the DSN memory 22, for a user device, a group or devices, or for public access and establishes per vault dispersed storage (DS) error encoding parameters for a vault. The managing unit 18 Facilitates storage or DS error encoding parameters for each vault by updating registry information or the DSN 100, where the registry information may be stored in the DSN memory 22, a computing device 12-16, the managing unit 18, and/or the integrity processing unit 20.

The DS error encoding parameters (e.g., or dispersed storage error coding parameters) include data segmenting information (e.g., how many segments data (e.g., a file, a group or files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 100, and/or establishing authentication credentials for the storage units 36. Network operations can further include monitoring read, write and/or delete communications attempts, which attempts could be in the form of requests. Network administration includes monitoring devices and/or units for failures, maintaining vault information, determining device and/or unit activation status, determining device and/or unit loading, and/or determining any other system level operation that affects the performance level of the DSN 100. Network maintenance includes facilitating replacing, upgrading, repairing, and/or expanding a device and/or unit of the DSN 100.

To support data storage integrity verification within the DSN 100, the integrity processing unit 20 (and/or other devices in the DSN such as managing unit 18) may assess and perform rebuilding of 'bad' or missing encoded data slices. At a high level, the integrity processing unit 20 performs rebuilding by periodically attempting to retrieve/list encoded data slices, and/or slice names or the encoded data slices, from the DSN memory 22. Retrieved encoded slices are assessed and checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number or valid encoded data slices or a set or encoded data slices is less than a relevant decode threshold number. The rebuilt slices may then be written to DSN memory 22. Note that the integrity processing unit 20 may be a separate unit as shown, included in DSN memory 22, included in the computing device 16, managing unit 18, stored on a DS unit 36, and/or distributed among multiple storage units 36.

Figure 2:
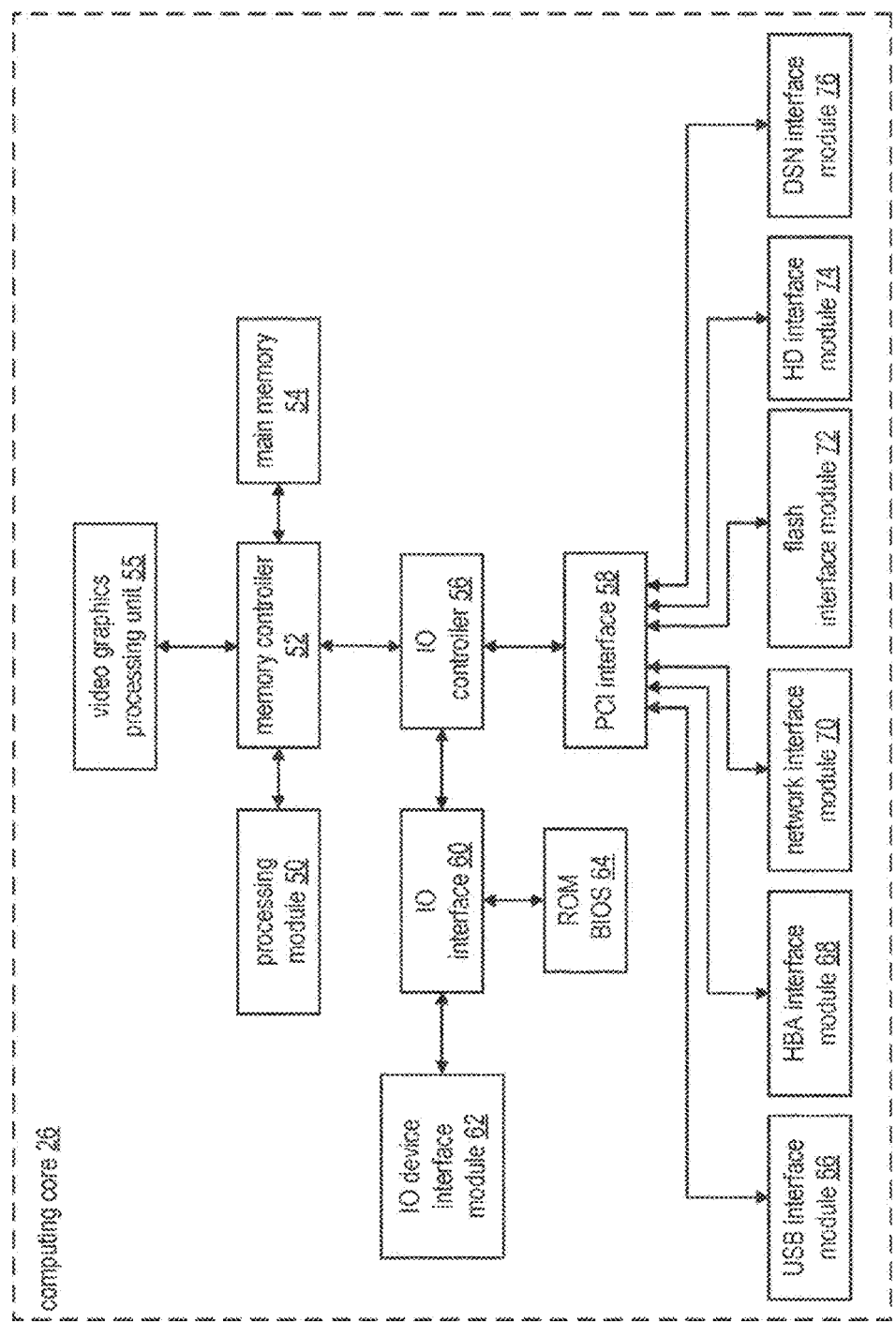
FIG. 2 provides a schematic illustration of a computer system, according to an embodiment of the invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interfaces 30-33 of FIG. 1. Note that the IO device interface module 62 and/or the memory interface modules 66-76 may be collectively or individually referred to as IO ports.

A data tree structure comprises a plurality of nodes. Each node comprises an index of entries. Traversing the nodes of the tree effects system processing based upon the information contained in the nodes according to the order of the traversal. System application programs seeking information from the tree submit requests which are processed by traversing the nodes of the tree. Traversing all nodes of the tree in response to a request is an effective but inefficient method for complying with the request.

Figure 3:
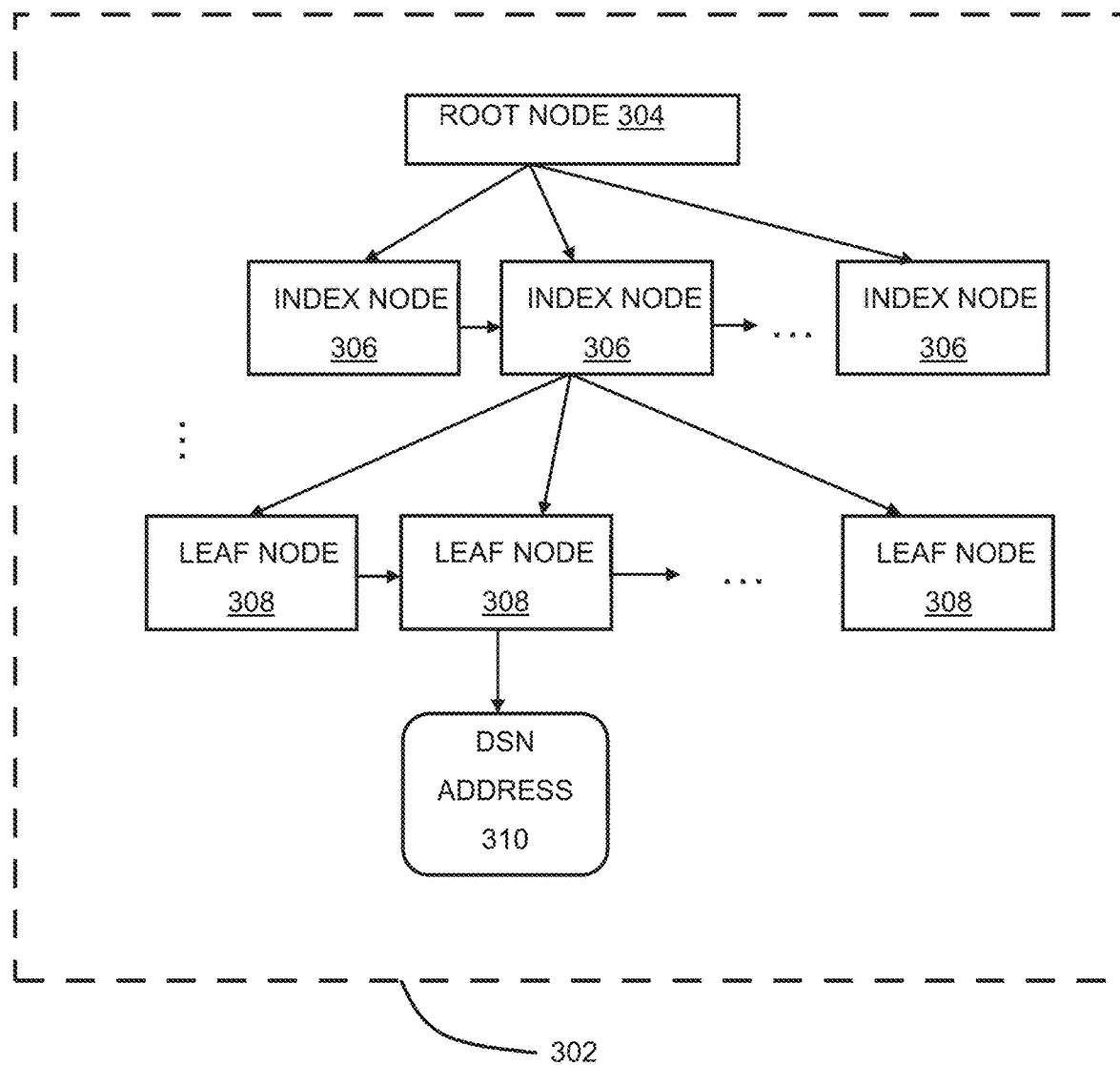
FIG. 3 provides a schematic illustration of a dispersed hierarchical data index tree structure, according to an embodiment of the invention.

FIG. 3 is a schematic block diagram of an embodiment of a dispersed storage network (DSN) that includes dispersed hierarchical index 302 such as a DLCI. The DSN functions to traverse the nodes of the dispersed hierarchical index 302, where the dispersed hierarchical index is utilized to locate a plurality of data objects stored as a plurality of sets of encoded data slices in a storage set, each plurality of sets of encoded data slices is associated with a DSN address, and where the dispersed hierarchical index enables keyword searching to locate a particular DSN address or a desired data object for access.

The dispersed hierarchical index 302 includes one root node 304 (e.g., in an index node at a top level), one or more intermediate index nodes 306 (e.g., parent index nodes at middle levels), and one or more leaf nodes 308 (e.g., index nodes at a lowest level). Each of the nodes (e.g., root node, index nodes, leaf nodes) may be implemented utilizing a data object and includes entries of one or more of: an associated index key range, pointers to other nodes (node pointers), and pointers to data objects stored in the storage set of the DSN. Such data object pointers include: a virtual DSN address 310 (e.g., a source name) corresponding to a storage location of the node and/or the data object within the storage set. Parent index nodes include pointers to child index nodes forming parent-child relationships (e.g., an index node of level 2 includes the pointer to an index node at level 3). Nodes may also include pointers to sibling level nodes on a common level of the index. Each node is dispersed storage error encoded to produce a set of index slices and each set of index slices is stored in the storage set at a location corresponding to a DSN address of the node.

The dispersed hierarchical index may be constructed and maintained to include dimensions associated with one or more index attributes. Index attributes includes one or more of: a maximum number of levels, a minimum number of levels (e.g., from the root index node at a top-level to the leaf nodes at a lowest level, a maximum number of child nodes in a parent-child node relationship, a minimum number of child nodes in the parent-child node relationship, a maximum number of sibling nodes at a common level, a minimum number of sibling nodes at the common level, a maximum number of entries in a node, and a minimum number of entries in the node.

A DLCI enables storage of key value pairs on a distributed system. In a DLCI, the number or entries in any particular node is variable. It is typically less than the configured "split size" but greater than the configured "join size". Also, the number or levels also varies based on the size of the index, and different usage patterns may result in different forms and patterns of growth for the indices in the tree.

In an embodiment, traversing the DLCI begins with the retrieval, from a request queue, of a node look-up request submitted by an application seeking node information. The look-up request may specify node names, node data range information as well as node depth information for the DLCI nodes of interest to the application. Comparators may be included in the look-up request to limit the node data range and depth information. The look-up request is then executed, and the named nodes are read by the system returning the read results to a results queue along with the names, data ranges and depths of the nodes which have been read. The node pointers of any read nodes are translated to read requests which are stored as node look-up requests in the request queue for retrieval and execution. This process of retrieval, execution, storage and look-up creation continues until al request queue look-up requests have been executed. The results queue then contains the look-up request results for all nodes relevant to the initial node look-up requests placed in the request queue.

Figure 4:
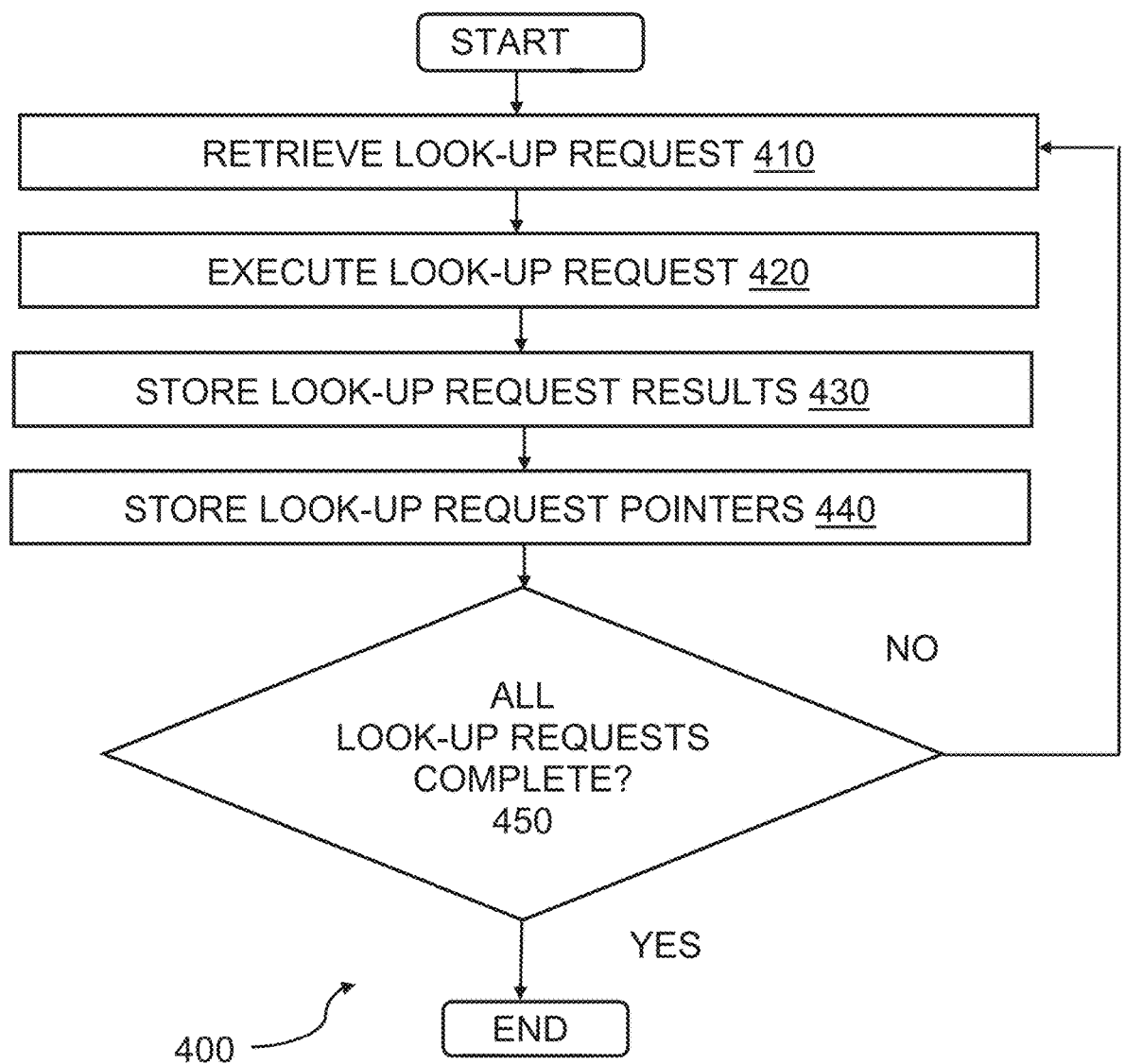
FIG. 4 depicts a flowchart of operating activities, according to an embodiment of the invention.

FIG. 4 provides a flowchart 400, illustrating exemplary activities associated with the practice of the disclosure. As shown in the figure, a node look-up request is retrieved from a request queue at 410. The node look-up request provides a definition of nodes where the look-up request will begin. At 420, the retrieved look-up request is executed across the nodes of the data structure. At 430, the results of the node read request are stored in a results queue. At 440, all pointers from the nodes of the look-up request are stored as new node look-up requests in the request queue. A check is made at 450 to determine if all node look-up requests in the request queue have been completed. If node look-up requests remain, the method returns to 410 and another node look-up request is retrieved from the request queue for execution. After all node look-up requests have been executed, the contents of the results queue may be provided as output to the requesting application.

In pseudocode the method may be represented as:

```
requestQueue.submit(rootNode)
while (!requestQueue.isEmpty( )) {
    currentRequest = requestQueue.pop( )
    result = lookup(currentRequest)
    for (child in result.children) {
        requestQueue.submit(child)
    }
    resultQueue.submit(result)
}
```

The respective request and results queues may be ordered according to node data range coverage and then node depth in the tree, or according to depth and then range, to provide different traversals of the data structure and to return different results. If the ordering considers range first then depth, then the tree will be traversed in depth-first order, since this ordering puts all lookups with ranges starting at "a" before lookups with ranges starting from "b", all the way from root to leaf. In contrast, an ordering that considers depth first and then range will traverse the tree in breadth-first order, since all lookups at depth 0 will be pulled from the request queue before all lookups at depth 1, and so on.

A listing of the leaf nodes only can be provided by using either of the above comparators (depth-first or breadth-first) on the request queue, and using a comparator that ignores depth, and only considers ranges, on the result queue (assuming the queue implementation overwrites elements that are considered equivalent by the comparator). In each instance, the range may be reversed to consider the nodes in reverse order.

In an embodiment, this approach may be considered similar to that used for prefix-delimiter listing, where a user provides a prefix which all of the returned entries must match and/or a delimiter which is used to group entries into one return value. As an example, a common use for prefix-delimiter listing is file path-like strings.

As an example, a DLCI containing names like "a/b/c", "a/b/d", . . . "a/b/z", "a/c/a", . . . "b/c/d" . . . representing a directory tree of folders "a" through "z", with two levels of subfolders, also labeled with "a"-"z". Then a listing with prefix "a" would return only the names logically contained in folder "a", and a listing with prefix "a" and delimiter "/" would return common prefixes "a/b", "a/c", etc. representing each of the subfolders of "a".

This prefix-delimiter approach may be achieved by pruning the children nodes submitted to the request queue, skipping children that have data ranges outside of the desired prefix, or that have data ranges entirely contained within a common prefix already submitted.

The pruning for prefix may be implemented manually, but the pruning for delimiter is easily encoded in the comparator, where entries that are equal up to the delimiter are considered equal. Encoding delimiter listing into the comparator in this way reduces the number of lookups for a particular common prefix. Only the boundaries of a common prefix are looked-up.

This approach allows all traversals of the nodes to share a common codebase, which can be optimized with parallelization, retry mechanisms, etc. without having to rewrite for each type of traversal. This approach also allows for easy parallelization. By simply having multiple threads pull from the request queue, multiple lookups are done in parallel. The results queue is also ordered, therefore no further coordination required between threads.

Figure 5:
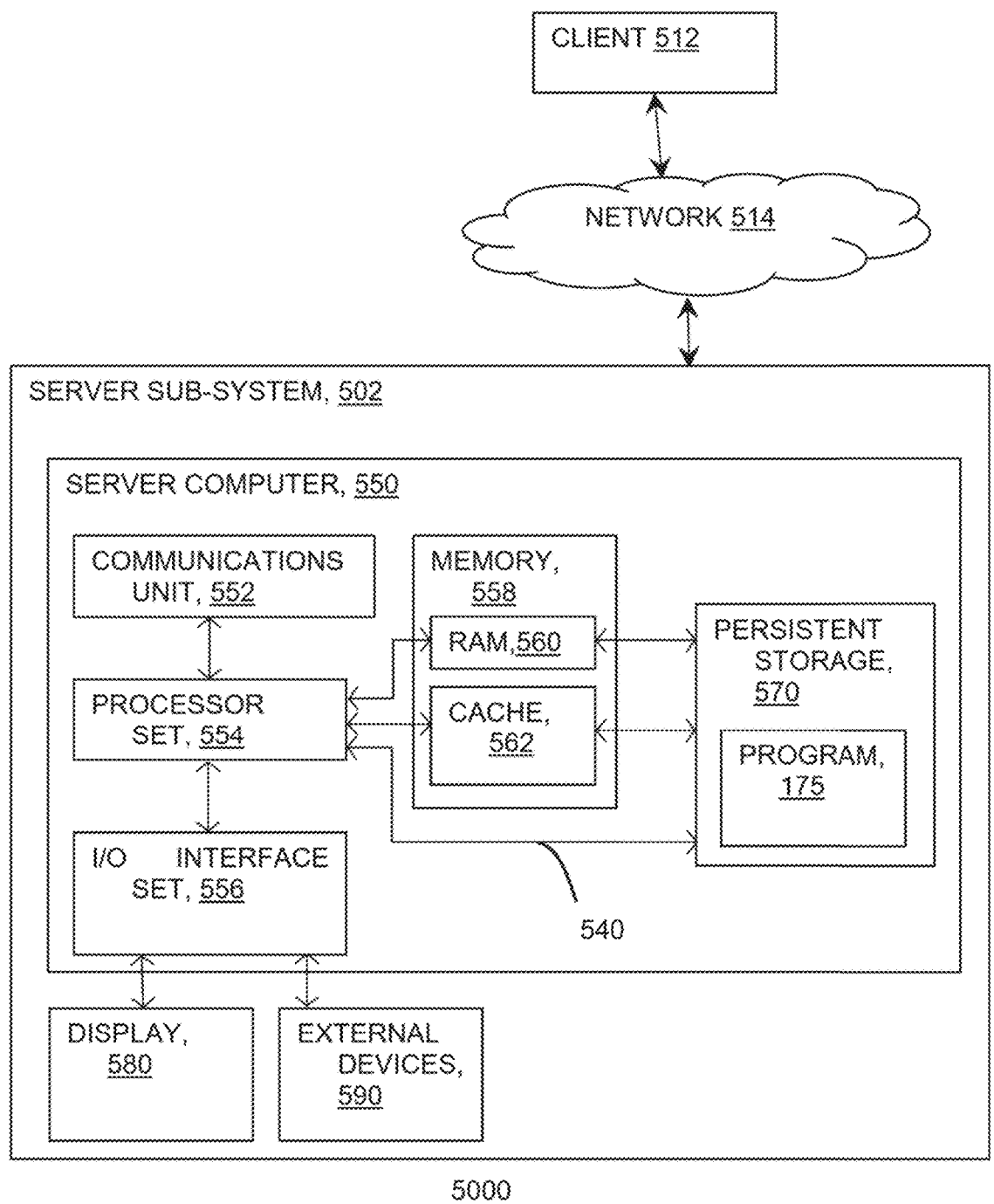
FIG. 5 provides a schematic illustration of a system, according to an embodiment of the invention.

FIG. 5 provides a schematic illustration of exemplary network resources associated with practicing the disclosed inventions. The inventions may be practiced in the processors of any of the disclosed elements which process an instruction stream. As shown in the figure, Client device 512, connects wirelessly to server sub-system 502 via network 514. As shown in FIG. 5, server sub-system 502 comprises a server computer 550. FIG. 5 depicts a block diagram of components of server computer 550 within a networked computer system 5000, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server computer 550 can include processor(s) 554, cache 562, memory 558, persistent storage 570, communications unit 552, input/output (I/O) interface(s) 556 and communications fabric 540. Communications fabric 540 provides communications between cache 562, memory 558, persistent storage 570, communications unit 552, and input/output (I/O) interface(s) 556. Communications fabric 540 can be implemented with any architecture designed for passing data and/or control information between processors (such as microprocessors, communications and network processors, etc.), system memory, peripheral devices, and any other hardware components within a system. For example, communications fabric 540 can be implemented with one or more buses.

Memory 558 and persistent storage 570 are computer readable storage media. In this embodiment, memory 558 includes random access memory 560 (RAM). In general, memory 558 can include any suitable volatile or non-volatile computer readable storage media. Cache 562 is a fast memory that enhances the performance of processor(s) 554 by holding recently accessed data, and data near recently accessed data, from memory 558.

Program instructions and data used to practice embodiments of the present invention, e.g., the software program 175, are stored in persistent storage 570 for execution and/or access by one or more of the respective processor(s) 554 of server computer 550 via cache 562. In this embodiment, persistent storage 570 includes a magnetic hard disk drive. Alternatively, or in addition to a magnetic hard disk drive, persistent storage 570 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 570 may also be removable. For example, a removable hard drive may be used for persistent storage 570. Other examples include optical and magnetic disks, thumb drives, and smart cards that are inserted into a drive for transfer onto another computer readable storage medium that is also part of persistent storage 570.

Communications unit 552, in these examples, provides for communications with other data processing systems or devices, including resources of client device 512. In these examples, communications unit 552 includes one or more network interface cards. Communications unit 552 may provide communications through the use of either or both physical and wireless communications links. Software distribution programs, and other programs and data used for implementation of the present invention, may be downloaded to persistent storage 570 of server computer 550 through communications unit 552.

I/O interface(s) 556 allows for input and output of data with other devices that may be connected to server computer 550. For example, I/O interface(s) 556 may provide a connection to external device(s) 590 such as a keyboard, a keypad, a touch screen, a microphone, a digital camera, and/or some other suitable input device. External device(s) 590 can also include portable computer readable storage media such as, for example, thumb drives, portable optical or magnetic disks, and memory cards. Software and data used to practice embodiments of the present invention, e.g., software program 175 on server computer 550, can be stored on such portable computer readable storage media and can be loaded onto persistent storage 570 via I/O interface(s) 556. I/O interface(s) 556 also connect to a display 580.

Display 580 provides a mechanism to display data to a user and may be, for example, a computer monitor. Display 580 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
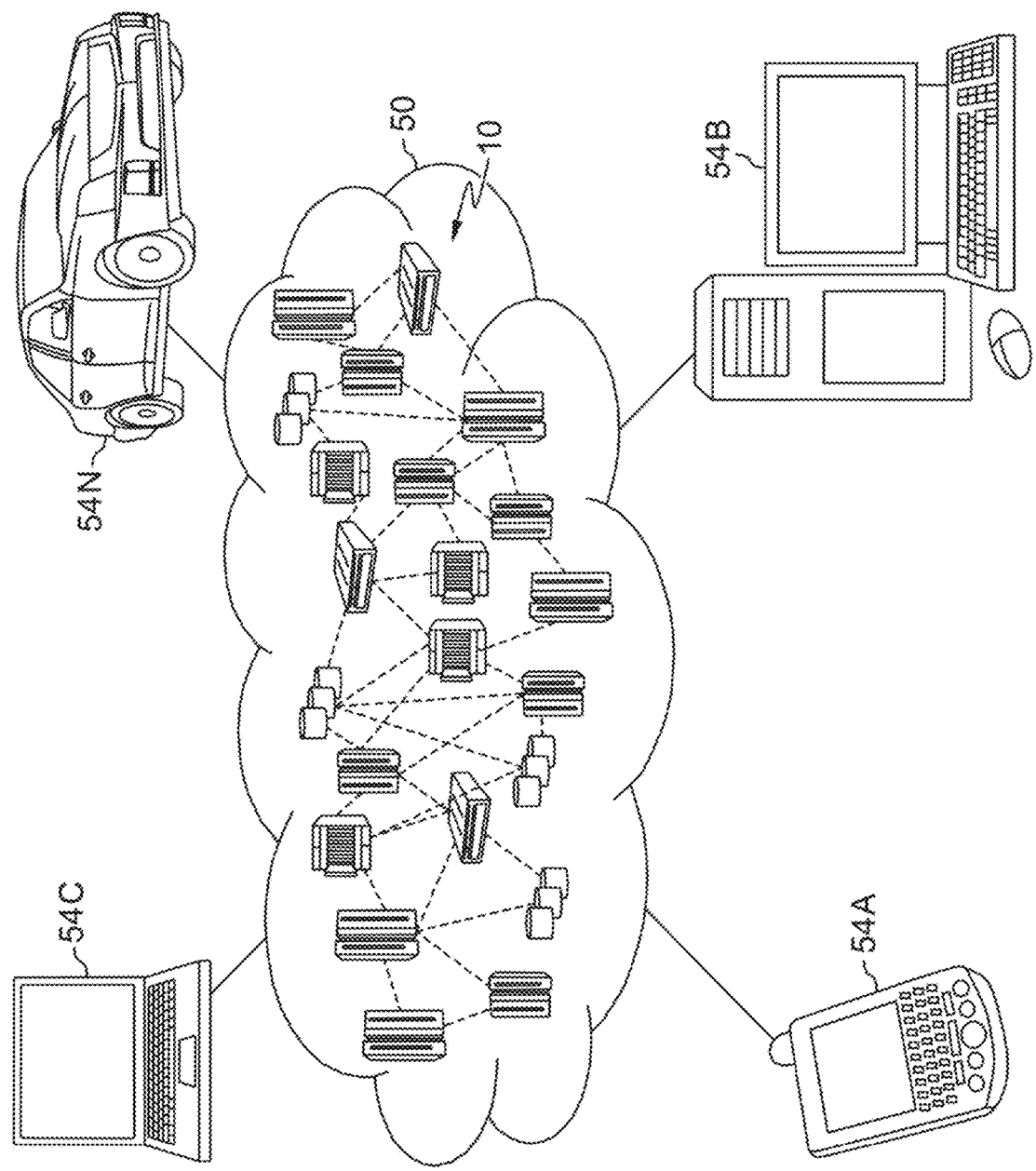
FIG. 6 depicts a cloud computing environment, according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
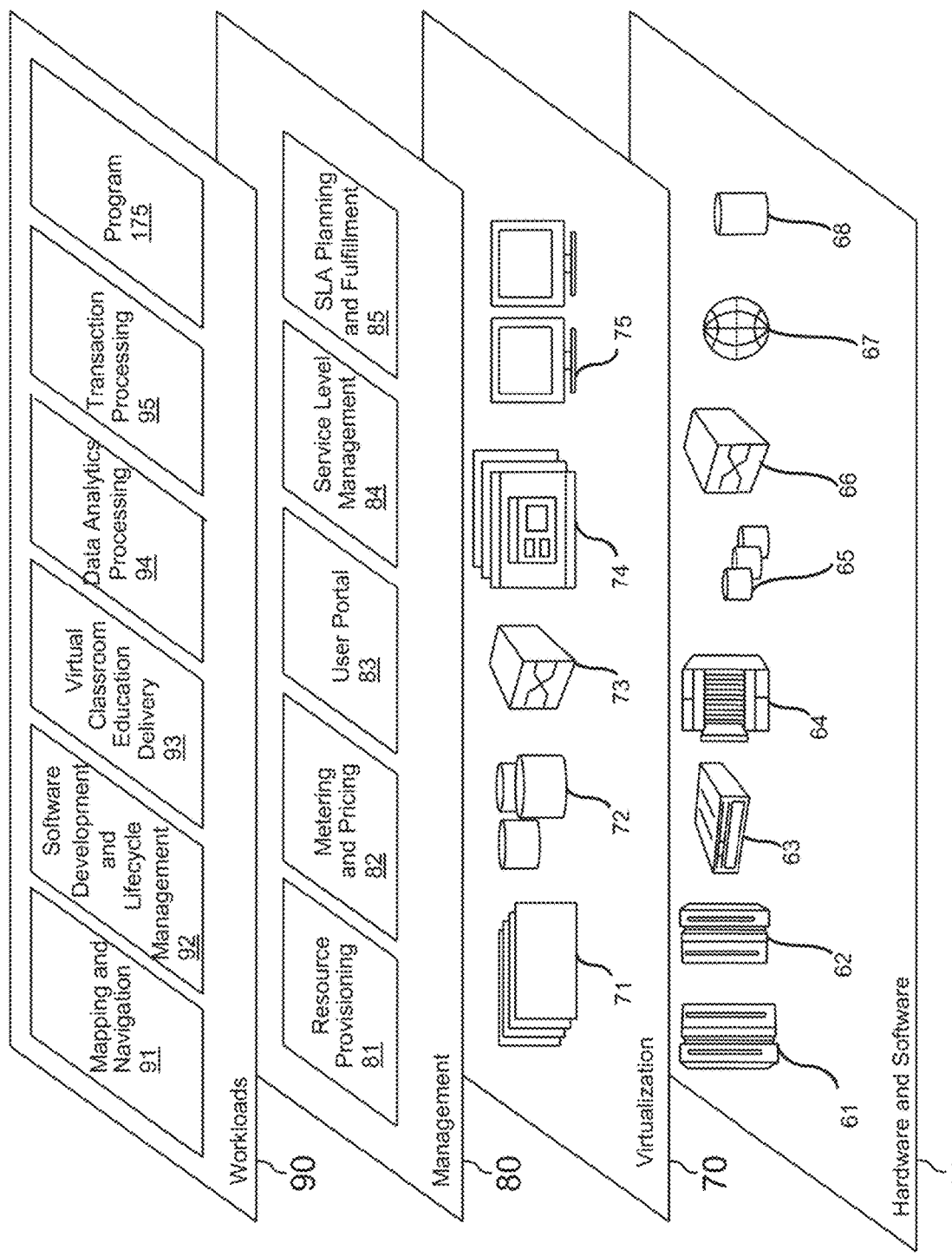
FIG. 7 depicts abstraction model layers, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for traversing nodes of a Dispersed Lockless Concurrent Index (DLCI), the method comprising:

retrieving, by one or more computer processors, a node look-up request from a request queue;
executing, by one or more computer processors, the node look-up request across nodes of a DLCI;
storing, by one or more computer processors, the node look-up request results in a results queue; and
adding, by one or more computer processors, new node look-up requests associated with any node pointers from the node(s) of the node look-up request, in the request queue.

2. The computer implemented method according to claim 1, wherein the request queue comprises a listing of DLCI node names to look-up, node data coverage ranges and node depth data.

3. The computer implemented method according to claim 1, wherein the results include the names of nodes read, node data coverage ranges and node depth data.

4. The computer implemented method according to claim 1, further comprising: specifying, by one or more computer processors, a logical comparator for at least one of the requests queue or the results queue.

5. The computer implemented method according to claim 1, further comprising: specifying, by one or more computer processors, requests queue nodes according to: node data coverage range, then node depth.

6. The computer implemented method according to claim 1, further comprising:
specifying, by one or more computer processors, requests queue nodes according to: node depth, then node data coverage range.

7. The computer implemented method according to claim 1, further comprising: providing, by one or more computer processors, output to an application according to the results queue.

8. A computer program product for traversing nodes of a Dispersed Lockless Concurrent Index (DLCI), the computer program product comprising one or more computer readable storage devices and stored program instructions on the one or more computer readable storage devices, the stored program instructions comprising:
programmed instructions for retrieving a node look-up request from a request queue;
programmed instructions for executing the node look-up request across nodes of a DLCI;
programmed instructions for storing the node look-up request results in a results queue; and
programmed instructions for adding new node look-up requests associated with node pointers from node(s) of the node look-up request, in the request queue.

9. The computer program product according to claim 8, wherein the request queue comprises a listing of DLCI node names to look-up, node data coverage ranges and node depth data.

10. The computer program product according to claim 8, wherein the results include the names of nodes read, node data coverage ranges and node depth data.

11. The computer program product according to claim 8, the stored programmed instructions further comprising:
programmed instructions for specifying a logical comparator for at least one of the requests queue or the results queue.

12. The computer program product according to claim 8, the stored programmed instructions further comprising:
programmed instructions for specifying requests queue nodes according to: node data coverage range, then node depth.

13. The computer program product according to claim 8, the stored programmed instructions further comprising:
   programmed instructions for specifying requests queue nodes according to: node depth, then node data coverage range.

14. The computer program product according to claim 8, the stored programmed instructions further comprising:
   programmed instructions for providing output to an application according to the results queue.

15. A computer system for traversing nodes of a Dispersed Lockless Concurrent Index (DLCI), the computer system comprising:
   one or more computer processors;
   one or more computer readable storage devices;
   stored program instructions on the one or more computer readable storage devices for execution by the at least on computer processor, the stored program instructions comprising:
      programmed instructions for retrieving a node look-up request from a request queue;
      programmed instructions for executing the node look-up request across nodes of a DLCI;
      programmed instructions for storing the node look-up request results in a results queue; and
      programmed instructions for adding, new node look-up requests associated with node pointers from node(s) of the look-up request, in the request queue.

16. The computer system according to claim 15, wherein the request queue comprises a listing of DLCI node names to look-up, node data coverage ranges and node depth data.

17. The computer system according to claim 15, wherein the results include the names of nodes read, node data coverage ranges and node depth data.

18. The computer system according to claim 15, the stored programmed instructions further comprising:
   programmed instructions for specifying a logical comparator for at least one of the requests queue or the results queue.

19. The computer system according to claim 15, the stored program instructions further comprising:
   programmed instructions for specifying requests queue nodes according to: node data coverage range, then node depth.

20. The computer system according to claim 15, the stored programmed instructions further comprising:
   programmed instructions for specifying requests queue nodes according to: node depth, then node data coverage range.

* * * * *